United States Patent
Yamanaka et al.

(10) Patent No.: US 8,798,838 B2
(45) Date of Patent: Aug. 5, 2014

(54) HYBRID VEHICLE CONTROL DEVICE

(75) Inventors: Fumihiro Yamanaka, Hiratsuka (JP); Masami Suzuki, Mishima (JP)

(73) Assignees: Nissan Motor Co., Ltd., Yokohama (JP); JATCO Ltd., Fuji-shi (JP)

( * ) Notice: Subject to any disclaimer, the term of this patent is extended or adjusted under 35 U.S.C. 154(b) by 0 days.

(21) Appl. No.: 13/980,843

(22) PCT Filed: Jan. 27, 2012

(86) PCT No.: PCT/JP2012/051760
§ 371 (c)(1), (2), (4) Date: Jul. 19, 2013

(87) PCT Pub. No.: WO2012/102369
PCT Pub. Date: Aug. 2, 2012

(65) Prior Publication Data
US 2013/0297135 A1    Nov. 7, 2013

(30) Foreign Application Priority Data

Jan. 28, 2011   (JP) .................................. 2011-016796

(51) Int. Cl.
*B60W 20/00* (2006.01)

(52) U.S. Cl.
USPC .................. 701/22; 701/36; 701/51; 701/54; 701/66; 701/67; 701/99; 701/101; 701/113; 903/902; 903/909; 903/915; 475/1; 475/2

(58) Field of Classification Search
None
See application file for complete search history.

(56) References Cited

U.S. PATENT DOCUMENTS

| | | | | |
|---|---|---|---|---|
| 6,077,186 | A * | 6/2000 | Kojima et al. | 477/3 |
| 8,579,759 | B2 * | 11/2013 | Akebono et al. | 477/5 |
| 8,636,620 | B2 * | 1/2014 | Nagashima et al. | 477/5 |
| 8,672,805 | B2 * | 3/2014 | Akebono et al. | 477/8 |
| 2002/0035006 | A1 * | 3/2002 | Suzuki et al. | 477/3 |
| 2004/0157704 | A1 * | 8/2004 | Stork et al. | 477/166 |
| 2005/0102082 | A1 * | 5/2005 | Joe et al. | 701/54 |
| 2008/0011529 | A1 * | 1/2008 | Hoher et al. | 180/65.2 |
| 2008/0017427 | A1 * | 1/2008 | Nakanowatari | 180/65.2 |
| 2010/0250074 | A1 * | 9/2010 | Hirasako et al. | 701/55 |
| 2010/0273604 | A1 * | 10/2010 | Imaseki | 477/5 |
| 2011/0082630 | A1 * | 4/2011 | Kawaguchi et al. | 701/58 |
| 2011/0256978 | A1 * | 10/2011 | Falkenstein | 477/5 |
| 2012/0108385 | A1 * | 5/2012 | Sano et al. | 477/5 |
| 2012/0202646 | A1 * | 8/2012 | Suzuki et al. | 477/5 |

(Continued)

FOREIGN PATENT DOCUMENTS

| | | | |
|---|---|---|---|
| JP | 2006-306210 | A | 11/2006 |
| JP | 2007-261498 | A | 10/2007 |
| JP | 2008-179235 | A | 8/2008 |
| JP | 2008-179242 | A | 8/2008 |

*Primary Examiner* — Jonathan M Dager
(74) *Attorney, Agent, or Firm* — Global IP Counselors, LLP (57) ABSTRACT

A control device of a hybrid vehicle includes an engine, a motor/generator, a first clutch, an automatic transmission, a second clutch, and startup/shifting simultaneous processing section. When engine speed increase control for increasing the engine speed by the motor/generator in order to start up the engine during travel and downshifting control of the automatic transmission are processed in parallel, the startup/shifting simultaneous processing section uses the motor torque of the motor/generator to increase the increase of input speed by the downshifting control to a target input speed while engine speed increase control is being performed by the motor/generator.

5 Claims, 6 Drawing Sheets

(56) References Cited

U.S. PATENT DOCUMENTS

| | | | |
|---|---|---|---|
| 2012/0203406 A1* | 8/2012 | Akebono et al. | 701/22 |
| 2013/0124027 A1* | 5/2013 | Tanishima et al. | 701/22 |
| 2013/0218391 A1* | 8/2013 | Aizawa et al. | 701/22 |
| 2013/0218392 A1* | 8/2013 | Aizawa et al. | 701/22 |
| 2013/0297136 A1* | 11/2013 | Yamanaka et al. | 701/22 |

* cited by examiner

| | B1<br>Fr/B | C1<br>I/C | C2<br>D/C | C3<br>H&LR/C | B2<br>LOW/B | B3<br>2346/B | B4<br>R/B | F1<br>1st OWC | F2<br>1&2 OWC |
|---|---|---|---|---|---|---|---|---|---|
| 1st | (O) | | | (O) | O | | | O | O |
| 2nd | | | | (O) | O | O | | | O |
| 3rd | | | O | | O | O | | | |
| 4th | | | O | O | | O | | | |
| 5th | | O | O | O | | | | | |
| 6th | | O | | O | | O | | | |
| 7th | O | O | | O | | | | O | |
| Rev. | O | | | O | | | O | | |

HYBRID VEHICLE CONTROL DEVICE

CROSS-REFERENCE TO RELATED APPLICATIONS

This application is a U.S. National stage application of International Application No. PCT/JP2012/051760, filed Jan. 27, 2012, which claims priority claims priority under to Japanese Patent Application No. 2011-16796, filed in Japan on Jan. 28, 2011, the entire contents of which is hereby incorporated by reference.

BACKGROUND

1. Field of the Invention

The present invention relates to a control device for a hybrid vehicle whereby engine startup control and downshifting control of an automatic transmission are processed simultaneously while the vehicle is traveling.

2. Background Information

In one conventional example of a hybrid vehicle, an engine, a first clutch, a motor/generator, an automatic transmission (second clutch), and drive wheels are sequentially aligned from upstream to downstream in the drive system, and a selection can be made between an EV travel mode and an HEV travel mode. It is disclosed that in this hybrid vehicle, when the timings of a shift request and an engine startup request overlap while the vehicle is traveling, engine startup control and shifting control are processed simultaneously so that the travel mode is switched smoothly or the shift position is switched smoothly (see Japanese Laid-Open Patent Publication No. 2007-261498, for example).

SUMMARY

However, in a conventional control device for a hybrid vehicle, when engine startup control and downshifting control are processed simultaneously, the engine startup control (cranking) is performed first, and the downshifting control is implemented after a synchronous determination of the first clutch is made. In other words, the progress of the downshifting control is stopped while the engine startup control is progressing, and the downshifting control progresses when the engine startup control ends. This causes problems in that the release pressure level differs due to a difference in the timing at which the engine startup request intervenes, and it is difficult to manage the drive force during cranking. Another problem is when the timings of the downshifting request and the engine startup request overlap while the vehicle is traveling; time is required to reach the drive force intended by the driver, regardless of a high acceleration request situation such as the driver pressing the acceleration pedal.

The present invention focuses on the problems described above, it being an object of the invention to provide a control device for a hybrid vehicle whereby, when engine startup and downshifting are processed in parallel while the vehicle is traveling, not only can the time required from the start of downshifting to the end of downshifting be shortened, but downshifting control that prevents draw shock can be easily performed.

To achieve the object described above, the hybrid vehicle control device of the present invention comprising an engine, a motor, a first clutch, an automatic transmission, a second clutch, and a controller that includes a startup/shifting simultaneous processing control section. The motor is provided to a drive system extending from the engine to a drive wheel, and the motor has a drive motor function as well as an engine startup motor function. The first clutch is installed between the engine and the motor, and the first clutch switches to a hybrid vehicle travel mode by engaging and an electric vehicle travel mode by disengaging. The automatic transmission is installed between the motor and the drive wheel, and the automatic transmission automatically varies a gear ratio. The second clutch is installed in any position from the motor to the drive wheel, and the second clutch maintains a slip-engaged state during engine startup control that includes during cranking. During a simultaneous processing of the engine startup control of initiated based on a startup request, and downshifting control of the automatic transmission initiated based on a shift request while traveling, the startup/shifting simultaneous processing section executes the engine startup control and the downshifting control in parallel, completes downshifting before completing engine startup by engaging an engaged element which is engaged for the purpose of downshifting, and puts the state of the automatic transmission into a state of transmitting drive force in the shift position after the downshifting.

Consequently, when engine speed increase control and downshifting control are processed in parallel while the vehicle is traveling, control is performed for using the motor torque of the motor to increase the increase in input speed by the downshifting control to a target input speed during the engine speed increase control by the motor. When engine speed increase control and downshifting control are processed in parallel while the vehicle is traveling, the time required to end downshifting is shortened by causing downshifting to progress in a responsive manner due to the speed increase by the motor. One element of downshift engaging is that downshifting control by oil pressure replacement is simple, as downshifting is preferably done after the input speed increases. As a result, when engine startup and downshifting are processed in parallel while the vehicle is traveling, not only can the time required from the start of downshifting to the end of downshifting be shortened, but downshifting control that prevents draw shock can be easily performed.

DETAILED DESCRIPTION OF THE EMBODIMENTS

A hybrid vehicle control device of the present invention is described below based on Embodiment 1 shown in the drawings.

Embodiment 1

Figure 1:
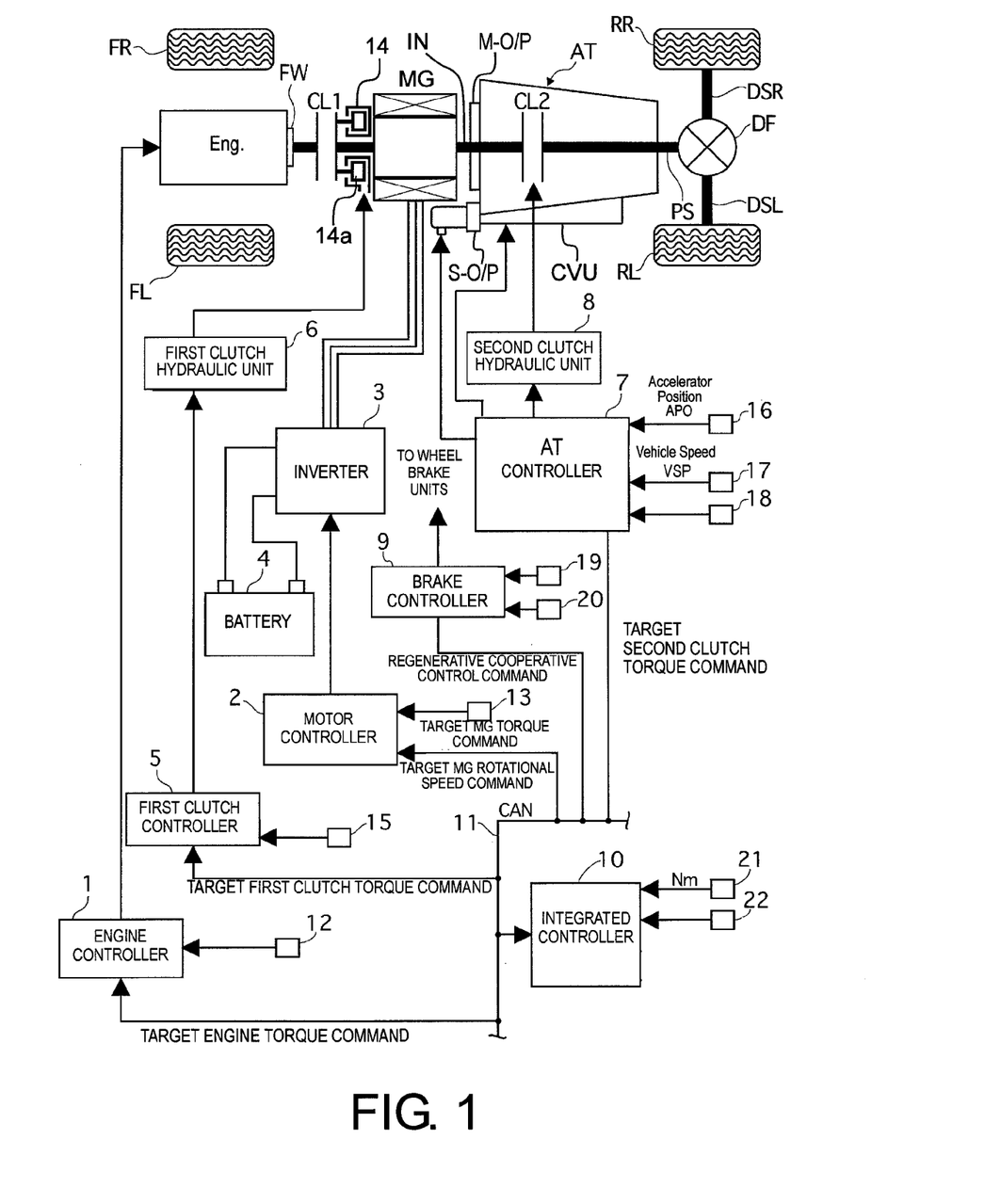
FIG. 1 is an overall system diagram showing a rear-wheel drive FR hybrid vehicle (one example of a hybrid vehicle) to which the control device of Embodiment 1 is applied.

First, the configuration is described. FIG. 1 shows a rear-wheel drive FR hybrid vehicle (one example of a hybrid vehicle) to which the control device of Embodiment 1 is applied. The overall system configuration is described below based on FIG. 1.

The drive system of the FR hybrid vehicle in Embodiment 1 has an engine Eng, a first clutch CL1, a motor/generator MG (a motor), a second clutch CL2, an automatic transmission AT, a transmission input shaft IN, a mechanical oil pump M-O/P, a sub-oil pump S-O/P, a propeller shaft PS, a differential DF, a left drive shaft DSL, a right drive shaft DSR, a left rear wheel RL (a drive wheel), and a right rear wheel RR (a drive wheel), as shown in FIG. 1. FL indicates a left front wheel and FR indicates a right front wheel.

The engine Eng is a gasoline engine or a diesel engine, and engine startup control, engine stop control, valve opening degree control of a throttle valve, fuel cutting control, and the like are performed based on engine control commands from an engine controller 1. A flywheel FW is provided to the engine output shaft.

The first clutch CL1 is a clutch installed between the engine Eng and the motor/generator MG, and the engaging, semi-engaging, and disengaging thereof are controlled by first clutch control oil pressure generated by a first clutch hydraulic unit 6 on the basis of a first clutch control command from a first clutch controller 5. A normally closed dry single-plate clutch is used as the first clutch CL1, wherein a full engagement is held by the urging force of a diaphragm spring, and full engaging to full disengaging is controlled by stroke control using a hydraulic actuator 14 having a piston 14a, for example.

The motor/generator MG is a synchronous motor/generator in which a permanent magnet is embedded in a rotor and a stator coil is wound around a stator, and the motor/generator MG is controlled by the application of a three-phase alternating current generated by an inverter 3 on the basis of a control command from a motor controller 2. This motor/generator MG can also operate as an electric motor rotatably driven by the supply of power from a battery 4 (this operating state is referred to below as "powered"), and can also function as a power generator for generating electromotive force at both ends of the stator coil and can charge the battery 4 when the rotor receives rotational energy from the engine Eng or the drive wheels (this operating state is referred to below as "regenerating"). The rotor of the motor/generator MG is linked to the transmission input shaft IN of the automatic transmission AT.

The second clutch CL2 is a clutch installed between the motor/generator MG and the left and right rear wheels RL, RR, and the engaging, slip, engaging, and disengaging thereof are controlled by control oil pressure generated by a second clutch hydraulic unit 8 on the basis of a second clutch control command from an AT controller 7. A normally-open wet multi-plate clutch or wet multi-plate brake is used as the second clutch CL2, wherein the oil flow rate and oil pressure can be continuously controlled by a proportional solenoid, for example. The first clutch hydraulic unit 6 and the second clutch hydraulic unit 8 are housed within an AT hydraulic control valve unit CVU appended to the automatic transmission AT.

The automatic transmission AT is a multi-step transmission which automatically switches a stepwise shift position in response to the vehicle speed, the accelerator position, or the like. In Embodiment 1, the automatic transmission AT is a multi-step transmission having seven forward speeds and one reverse speed. In Embodiment 1, the second clutch CL2 is not a newly added specialized clutch independent of the automatic transmission AT, but a friction element (a clutch or a brake) that complies with predetermined conditions is selected from a plurality of friction elements engaged in the different shift positions of the automatic transmission AT.

The transmission input shaft IN (=motor shaft) of the automatic transmission AT is provided with the mechanical oil pump M-O/P, which is driven by the transmission input shaft IN. When the discharge pressure from the mechanical oil pump M-O/P is insufficient at times such as when the vehicle has stopped, the sub-oil pump S-O/P, which is driven by an electric motor in order to suppress oil pressure loss, is provided to a motor housing or the like. Drive control of the sub-oil pump S-O/P is performed by the AT controller 7, described hereinafter.

The propeller shaft PS is linked to the transmission output shaft of the automatic transmission AT. The propeller shaft PS is linked to the left and right rear wheels RL, RR via the differential DF, the left drive shaft DSL, and the right drive shaft DSR.

As travel modes according to differences in the forms of driving, the FR hybrid vehicle has an electric automobile travel mode ("EV travel mode" below), a hybrid vehicle travel mode ("HEV travel mode" below), and a drive torque control travel mode ("WSC travel mode" below).

The "EV travel mode" is a mode in which the first clutch CL1 is disengaged and the vehicle travels only by the drive force of the motor/generator MG, and the EV travel mode includes a motor travel mode and a regenerating travel mode. This "EV travel mode" is selected when the required drive force is low and a battery SOC is ensured.

The "HEV travel mode" is a mode in which the vehicle travels with the first clutch CL1 engaged, including a motor assist travel mode, a power generating travel mode, and an engine travel mode. The vehicle travels in any of these modes. The "HEV travel mode" is selected when the required drive force is high or when the battery SOC is insufficient.

The "WSC travel mode" is a mode in which the vehicle travels while the second clutch CL2 is maintained in a slip-engaged state by the speed control of the motor/generator MG and the clutch torque capacity is controlled. The clutch torque capacity of the second clutch CL2 is controlled so that the drive torque transmitted past the second clutch CL2 will meet the drive torque as required by the accelerator depression by the driver. This "WSC travel mode" is selected in a travel area in which the engine speed falls below the idling speed, such as when "HEV travel mode" has been selected and the vehicle stops, starts to move, or decelerates.

Next, the control system of the FR hybrid vehicle is described. The control system of the FR hybrid vehicle in Embodiment 1 is configured including the engine controller 1, the motor controller 2, the inverter 3, the battery 4, the first clutch controller 5, the first clutch hydraulic unit 6, the AT controller 7, the second clutch hydraulic unit 8, a brake controller 9, and an integrated controller 10, as shown in FIG. 1. The controllers 1, 2, 5, 7, 9 and the integrated controller 10 are connected via a CAN communication line 11 that enables the controllers to exchange information with each other.

The engine controller 1 inputs engine speed information from an engine speed sensor 12, a target engine torque command from the integrated controller 10, and other necessary information. Commands for controlling engine operating points (Ne, Te) are outputted to a throttle valve actuator or the like of the engine Eng.

The motor controller 2 inputs information from a resolver 13 for detecting the rotor rotational position of the motor/generator MG, a target MG torque command and a target MG speed command from the integrated controller 10, and other necessary information. Commands for controlling motor operating points (Nm, Tm) of the motor/generator MG are outputted to the inverter 3. This motor controller 2 observes the battery SOC that expresses the charging capacity of the battery 4, and supplies this battery SOC information to the integrated controller 10 via the CAN communication line 11.

The first clutch controller 5 inputs sensor information from a first clutch stroke sensor 15 for detecting the stroke position of the piston 14a of the hydraulic actuator 14, a target CL1 torque command from the integrated controller 10, and other necessary information. Commands for controlling the engaging, semi-engaging, and disengaging of the first clutch CL1 are outputted to the first clutch hydraulic unit 6 in the AT hydraulic control valve unit CVU.

Figure 2:
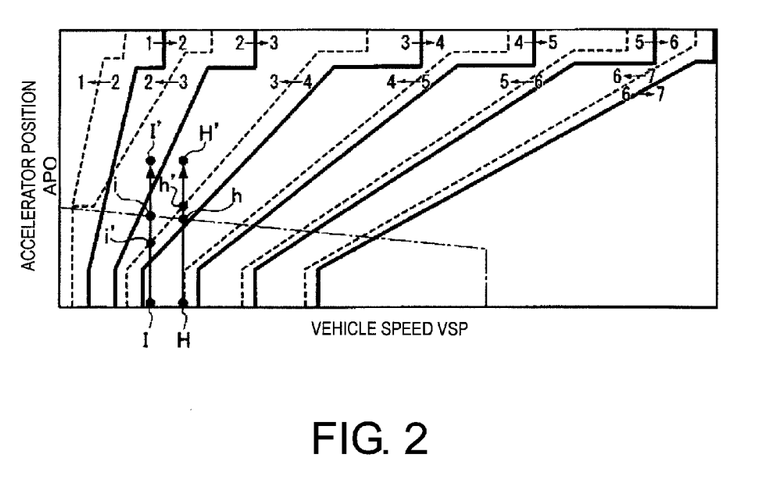
FIG. 2 is a diagram showing an example of an automatic transmission AT shift map designed for the AT controller 7 of Embodiment 1.

The AT controller 7 inputs information from sensors such as an accelerator position sensor 16, a vehicle speed sensor 17, and other sensors 18. During travel in which a D range is selected, driving points are determined according to the accelerator position APO and the vehicle speed VSP, the positions of these driving points on the shift map shown in FIG. 2 are used to find optimal shift positions, and control commands for achieving the found shift positions are outputted to the AT hydraulic control valve unit CVU. In this shift map, up shifting curves and downshifting curves are drawn according to the accelerator position APO and the vehicle speed VSP, as shown in FIG. 2, for example. In addition to this shifting control, when a target CL2 torque command is inputted from the integrated controller 10, second clutch control is performed for outputting a command for controlling the slip engagement of the second clutch CL2 to the second clutch hydraulic unit 8 in the AT hydraulic control valve unit CVU. When the downshifting request timing from the AT controller 7 and the engine startup request timing from the integrated controller 10 overlap in a deviation-allowing range, engine startup control and downshifting control are processed simultaneously according to predetermined program specifics.

The brake controller 9 inputs sensor information from a vehicle wheel speed sensor 19 for detecting the vehicle wheel speeds of the four wheels and a brake stroke sensor 20, a regeneration cooperative control command from the integrated controller 10, and other necessary information. When the brake is depressed, for example, and when regenerative braking force is given priority but is insufficient alone for the braking force required by the brake stroke BS, regeneration cooperative control is performed so as to compensate for this insufficiency with mechanical braking force (liquid-pressure braking force).

Figure 3:
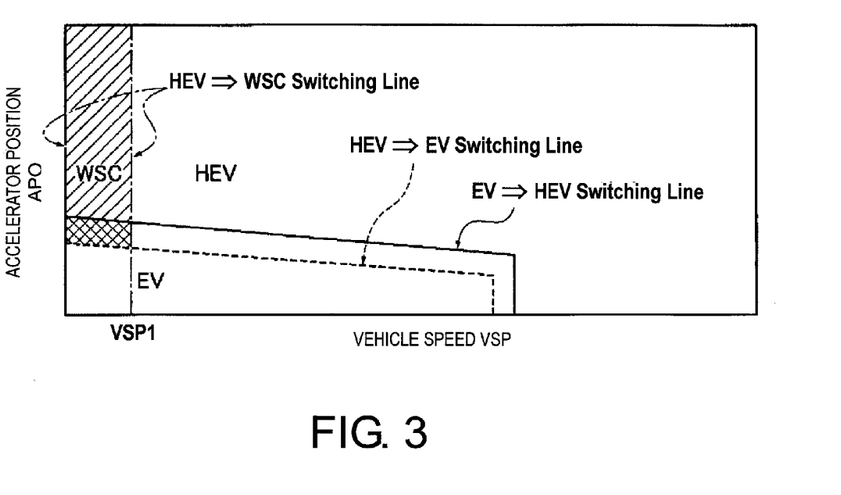
FIG. 3 is a diagram showing an example of an EV-HEV selection map designed for the mode selector of the integrated controller 10 of Embodiment 1.

The integrated controller 10 has the function of managing the energy consumed by the entire vehicle and enabling the vehicle to travel at maximum efficiency, and the integrated controller 10 inputs necessary information from a motor speed sensor 21 for detecting the motor speed Nm and from other sensors and switches 22, and also information via the CAN communication line 11. The integrated controller 10 also outputs a target engine torque command to the engine controller 1, a target MG torque command and a target MG speed command to the motor controller 2, a target CL1 torque command to the first clutch controller 5, a target CL2 torque command to the AT controller 7, and a regeneration cooperative control command to the brake controller 9. The integrated controller 10 has a mode selector for retrieving the optimal travel mode according to positions of driving points determined by the accelerator position APO and the vehicle speed VSP, as shown on the EV-HEV selection map of FIG. 3; and for selecting the retrieved travel mode as the target travel mode. The EV-HEV selection map includes: an EV→HEV switching line, where "EV travel mode" switches to "HEV travel mode" when the driving point (APO, VSP) in the EV area crosses the line; an HEV→EV switching line, where "HEV travel mode" switches to "EV travel mode" when the driving point (APO, VSP) in the HEV area crosses the line; and an HEV→WSC switching line, where the mode switches to "WSC travel mode" when "HEV travel mode" has been selected and the driving point (APO, VSP) enters the WSC area. The EV→HEV switching line and the HEV→EV switching line are set with a hysteresis quantity as a line dividing the EV area and the HEV area. The HEV→WSC switching line is set to a first set vehicle speed VSP1 at which the engine Eng maintains idling speed when the automatic transmission AT has selected the first speed. When "EV travel mode" has been selected and the battery SOC falls to a predetermined value or below, "HEV travel mode" is forcefully implemented as the target travel mode.

In the integrated controller 10, when "EV travel mode" has been selected and the mode selector then selects "HEV travel mode" as the target travel mode, the transition to "HEV travel mode" is made through engine startup control. The engine startup control puts the first clutch CL1, which had been disengaged in "EV travel mode," into a semi-engaged state, cranks the engine Eng with the motor/generator MG as a starter motor, and starts up the engine Eng by supplying fuel or by ignition. The first clutch CL1 is engaged after rotation synchronization is complete. During this engine startup control execution, the motor/generator MG is changed from torque control to speed control, and differential rotation is created, causing the second clutch CL2 to be slip-engaged. In other words, torque fluctuations that accompany the engine startup control are absorbed by the second clutch CL2, and engine startup shock is prevented, which is caused by the transmission of fluctuating torque to the left and right rear wheels RL, RR.

When "HEV travel mode" has been selected and the mode selector then selects "EV travel mode" as the target travel mode, the transition to "EV travel mode" is made through engine startup control. In this engine startup control, after the first clutch CL1, which had been engaged in "HEV travel mode," is disengaged, the cutoff engine Eng is stopped. When this engine stop control is being executed, similar to the engine startup control, the motor/generator MG is changed from torque control to speed control, and differential rotation is created, causing the second clutch CL2 to be slip-engaged. In other words, torque fluctuations that accompany the engine stop control are absorbed by the second clutch CL2, and engine startup shock is prevented, which is caused by the transmission of fluctuating torque to the left and right rear wheels RL, RR.

Figure 4:
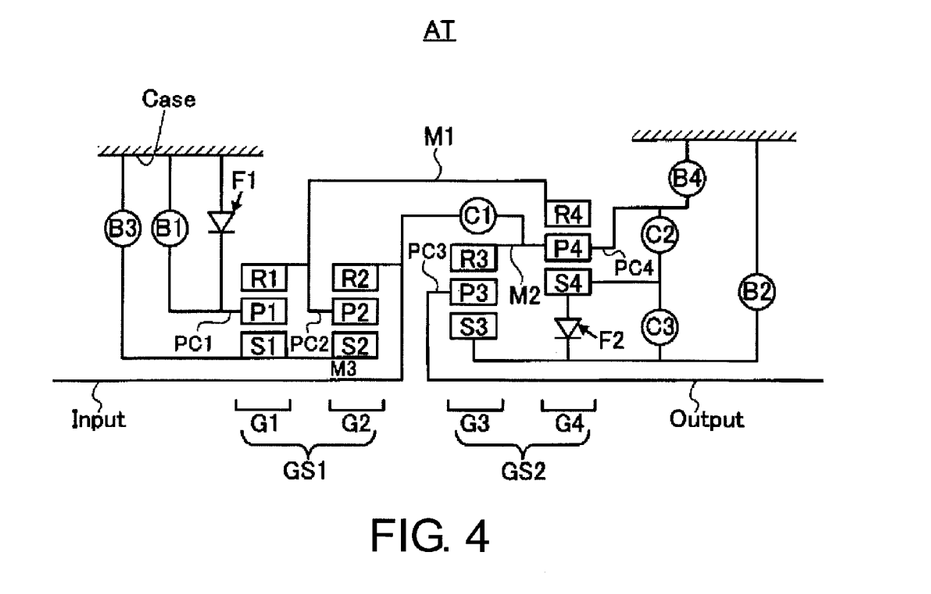
FIG. 4 is a skeleton diagram showing an example of an automatic transmission AT installed in a FR hybrid vehicle to which the control device of Embodiment 1 is applied.

FIG. 4 shows an example of an automatic transmission AT installed in a FR hybrid vehicle to which the control device of Embodiment 1 is applied. The configuration of the automatic transmission AT is described below based on FIG. 4.

The automatic transmission AT is a multi-speed automatic transmission having seven forward speeds and one reverse speed, wherein drive force from the engine Eng and/or the motor/generator MG is inputted from a transmission input shaft Input, the rotational speed is changed by a shifting gear mechanism having four planetary gears and seven friction elements, and the force is outputted from a transmission output shaft Output.

The shifting gear mechanism contains the following arranged sequentially along a shaft from the transmission input shaft Input to the transmission output shaft Output: a first planetary gear set GS1 comprising a first planetary gear G1 and a second planetary gear G2, and a second planetary gear set GS2 comprising a third planetary gear G3 and a fourth planetary gear G4. A first clutch C1, a second clutch C2, a third clutch C3, a first brake B1, a second brake B2, a third brake B3, and a fourth brake B4 are arranged as hydraulically actuated friction elements. A first one-way clutch F1 and a second one-way clutch F2 are arranged as mechanically actuated friction elements.

The first planetary gear G1 is a single pinion planetary gear having a first sun gear S1, a first ring gear R1, and a first carrier PC1 for supporting a first pinion P1 which meshes with the gears S1, R1. The second planetary gear G2 is a single pinion planetary gear having a second sun gear S2, a second ring gear R2, and a second carrier PC2 for supporting a second pinion P2 which meshes with the gears S2, R2.

The third planetary gear G3 is a single pinion planetary gear having a third sun gear S3, a third ring gear R3, and a third carrier PC3 for supporting a third pinion P3 that meshes with the gears S3, R3. The fourth planetary gear G4 is a single pinion planetary gear having a fourth sun gear S4, a fourth ring gear R4, and a fourth carrier PC4 for supporting a fourth pinion P4 that meshes with the gears S4, R4.

The transmission input shaft Input is linked to the second ring gear R2, and rotational drive force is inputted from the engine Eng and/or the motor/generator MG. The transmission output shaft Output is linked to the third carrier PC3, and output rotational drive force is transmitted to the drive wheel (the left and right rear wheels RL, RR) via a final gear or the like.

The first ring gear R1, the second carrier PC2, and the fourth ring gear R4 are integrally linked by a first linking member M1. The third ring gear R3 and the fourth carrier PC4 are integrally linked by a second linking member M2. The first sun gear S1 and the second sun gear S2 are integrally linked by a third linking member M3.

The first planetary gear set GS1 is configured having four rotating elements, by linking the first planetary gear G1 and the second planetary gear G2 through the first linking member M1 and the third linking member M3. The second planetary gear set GS2 is configured having five rotating elements, by linking the third planetary gear G3 and the fourth planetary gear G4 through the second linking member M2.

In the first planetary gear set GS1, torque is inputted from the transmission input shaft Input to the second ring gear R2, and the inputted torque is outputted to the second planetary gear set GS2 via the first linking member M1. In the second planetary gear set GS2, torque is inputted from the transmission input shaft Input to the second linking member M2 and inputted to the fourth ring gear R4 via the first linking member M1, and the inputted torque is outputted from the third carrier PC3 to the transmission output shaft Output.

The first clutch C1 (=input clutch I/C) is a clutch for selectively disconnecting the transmission input shaft Input and the second linking member M2. The second clutch C2 (=direct clutch D/C) is a clutch for selectively disconnecting the fourth sun gear S4 and the fourth carrier PC4. The third clutch C3 (=H&LR clutch H&LR/C) is a clutch for selectively disconnecting the third sun gear S3 and the fourth sun gear S4.

The second one-way clutch F2 (=1&2 speed one-way clutch 1&2 OWC) is disposed between the third sun gear S3 and the fourth sun gear S4. Thereby, when the third clutch C3 is disengaged and the rotational speed of the fourth sun gear S4 is greater than the third sun gear S3, the third sun gear S3 and the fourth sun gear S4 will have independent rotational speeds. Consequently, the third planetary gear G3 and the fourth planetary gear G4 are connected via the second linking member M2, and the respective planetary gears achieve independent gear ratios.

The first brake B1 (=front brake Fr/B) is a brake for selectively stopping the rotation of the first carrier PC1 relative to a transmission case Case. The first one-way clutch F1 (=one-speed one-way clutch 1stOWC) is arranged in parallel with the first brake B1. The second brake B2 (=low brake LOW/B) is a brake for selectively stopping the rotation of the third sun gear S3 relative to the transmission case Case. The third brake B3 (=2346 brake 2346/B) is a brake for selectively stopping the rotation of the third linking member M3, which links the first sun gear S1 and the second sun gear S2, relative to the transmission case Case. The fourth brake B4 (=reverse brake R/B) is a brake for selectively stopping the rotation of the fourth carrier PC4 relative to the transmission case Case.

Figure 5:
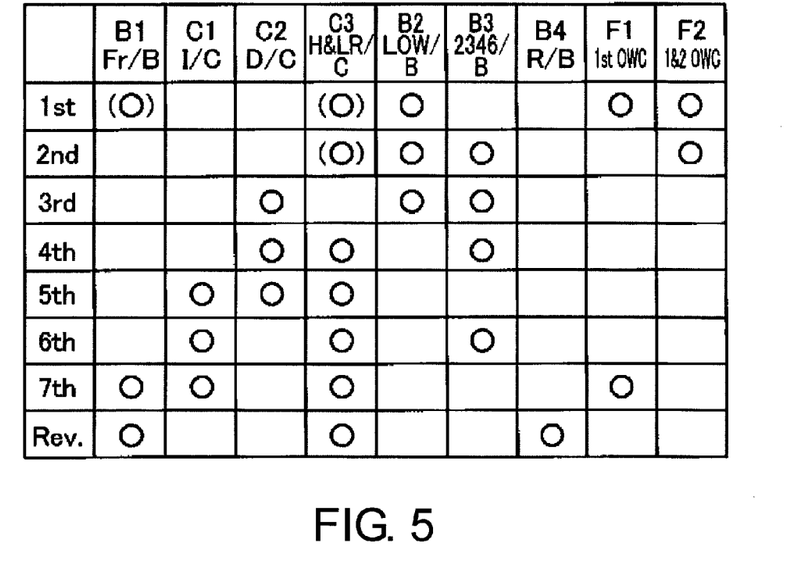
FIG. 5 is an engagement action table showing the engaged states of the friction elements at each shift position of the automatic transmission AT installed in the FR hybrid vehicle to which the control device of Embodiment 1 is applied.

FIG. 5 is an engaging action table showing the engaged states of the friction elements at each shift position of the automatic transmission AT installed in the FR hybrid vehicle to which the control device of Embodiment 1 is applied. In FIG. 5, the O symbols indicate that the corresponding friction element is hydraulically engaged during driving, the (O) symbols indicate that the corresponding friction element is hydraulically engaged during coasting (a one-way clutch actuation during driving), and the absence of a symbol indicates that the corresponding friction element is disengaged.

With the friction elements provided to the shifting gear mechanism configured as described above, shift positions including seven forward speeds and one reverse speed can be achieved as described below by performing a replacement shift of disengaging one friction element that had been engaged and engaging one friction element that had been disengaged. Specifically, in the "first speed," only the second brake B2 is engaged, and the first one-way clutch F1 and second one-way clutch F2 are thereby locked. In the "second speed," the second brake B2 and the third brake B3 are engaged, and the second one-way clutch F2 is locked. In the "third speed," the second brake B2, the third brake B3, and the second clutch C2 are engaged, and neither the first one-way clutch F1 nor the second one-way clutch F2 are locked. In the "fourth speed," the third brake B3, the second clutch C2, and the third clutch C3 are engaged. In the "fifth speed," the first clutch C1, the second clutch C2, and the third clutch C3 are engaged. In the "sixth speed," the third brake B3, the first clutch C1, and the third clutch C3 are engaged. In the "seventh speed," the first brake B1, the first clutch C1, and the third clutch C3 are engaged, and the first one-way clutch F1 is locked. In the "reverse speed," the fourth brake B4, the first brake B1, and the third clutch C3 are engaged.

Figure 6:
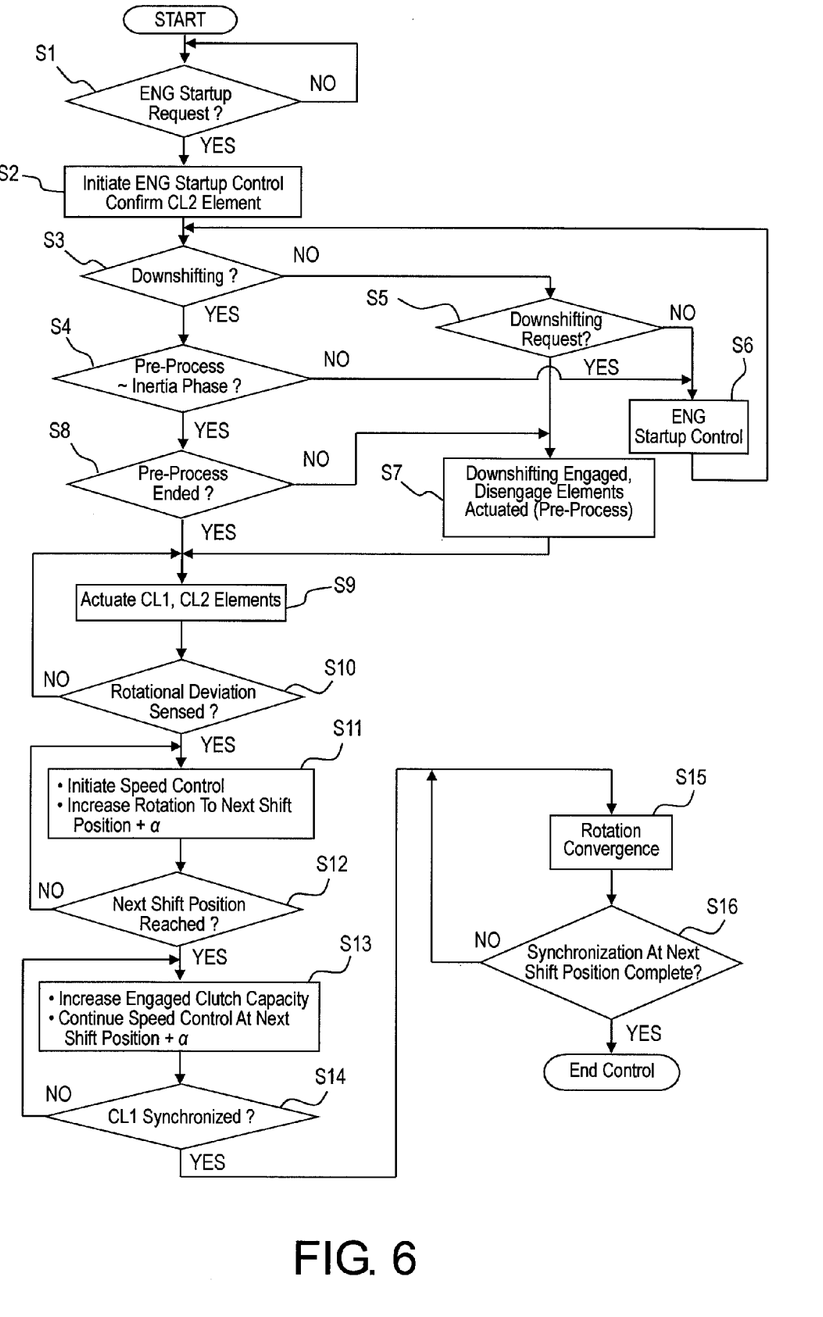
FIG. 6 is a flowchart showing the configuration and flow of the simultaneous processing of engine startup control and downshifting control performed by the integrated controller 10 of Embodiment 1.

FIG. 6 shows the configuration of the simultaneous processing of engine startup control and downshifting control performed by the integrated controller 10 of Embodiment 1 (startup/shifting simultaneous processing means). The steps of FIG. 6 are described below.

In step S1, a determination is made as to whether or not during travel with "EV travel mode" selected, there is an engine startup request outputted based on an "HEV travel mode" selection that the travel mode be switched to "HEV travel mode." When the determination is YES (there is an engine startup request), the flow advances to step S2, and when the determination is NO (there is not an engine startup request), the determination of step S1 is repeated.

In step S2, continuing from the determination that there is an engine startup request in step S1, engine startup control is initiated, the second clutch CL2 as the friction element is confirmed, and the flow advances to step S3. One of the friction elements engaged in the various shift positions can be selected as the second clutch CL2 slip-controlled in the engine startup control area, but the second clutch CL2 is defined as the element that is engaged at the shift position at least after downshifting. More specifically, the friction element selected is an element that is engaged or that remains engaged without disengaging even when engine startup control and shifting control are simultaneously processed, and the selected element is the second clutch CL2. When the current shift position is the "first speed," for example, the element selected is the second brake B2 which remains engaged even when the speed is up shifted to the "second speed." When the current shift position is the "second speed," the element selected is the second brake B2 which remains engaged even when the speed is downshifted to the "first speed" or up shifted to the "second speed." By the same reasoning, the third brake B3 is selected when the current shift position is the "third speed," the second clutch C2 is selected when the current shift position is the "fourth speed," the third clutch C3 is selected when the current shift position is the "fifth speed," and the first clutch C1 or the third clutch C3 is selected when the current shift position is the "sixth speed" or "seventh speed."

In step S3, continuing either from the engine startup control initiation and the CL1, CL2 element actuation in step S2, or from the engine startup control in step S6, a determination is made as to whether or not downshifting is taking place in the automatic transmission AT. When the determination is YES (downshifting is taking place), the flow advances to step S4, and when the determination is NO (downshifting is not taking place), the flow advances to step S5.

In step S4, continuing from the determination that downshifting is taking place in step S3, a determination is made as whether or not downshifting progress is during a pre-process (stroke phase)-inertia phase. When the determination is YES (downshifting up to the inertia phase is taking place), the flow advances to step S8, and when the determination is NO (downshifting progresses beyond the inertia phase), the flow advances to step S6.

In step S5, continuing from the determination that downshifting is not taking place in step S3, a determination is made as whether or not there is a downshifting request outputted due to the driving point (APO, VSP) crossing the downshifting line during travel. When the determination is YES (there is a downshifting request), the flow advances to step S7, and when the determination is NO (there is no downshifting request), the flow advances to step S6.

In step S6, continuing either from the determination that downshifting is progressing beyond a finish phase in step S4, or from the determination that there is no downshifting request in step S5, engine startup control for starting up the engine Eng is performed while the slip-engaged state of the second clutch CL2 is maintained, and the flow returns to step S3.

In step S7, continuing either from the determination that there is a downshifting request in step S5, or from the determination that the pre-process in step S8 has not yet ended, actuation of the downshifting engaged elements and disengaged elements (pre-process actuation) is executed, and the flow advances to step S9. The pre-process of the downshifting engaged elements is a process of causing the piston to travel a slight stroke through application of initial pressure against a return spring force so as to fill in the gap between plates, and creating the conditions immediately before the torque capacity through clutch engagement is manifested. The pre-process of the downshifting disengaged elements is the process of reducing the torque capacity of the engaged elements engaged by line pressure to the starting range of the inertia phase. For example, in the case of downshifting from speed 4 to 3, the engaged element is the second brake B2 (=low brake LOW/B), and the disengaged element is the third clutch C3 (=H&LR clutch H&LR/C). When the pre-process ends, control of the motor/generator MG is switched from torque control to speed control.

In step S8, continuing from the determination that downshifting is during the pre-process-inertia phase in step S4, a determination is made as whether or not the downshifting pre-process has ended. When the determination is YES (pre-process has ended), the flow advances to step S9, and when the determination is NO (pre-process has not ended), the flow advances to step S7.

In step S9, as a continuation from either the execution of the pre-process in step S7, the determination that the pre-process has ended in step S8, or the determination that rotational deviation has not been sensed in step S10, the engaging action of putting the first clutch CL1 into a semi-engaged state is initiated, the disengaging action of putting the second clutch CL2 into a slip-engaged state is initiated, and the flow advances to step S10.

In step S10, continuing from the actuation of the CL1 and CL2 elements in step S9, a determination is made as whether or not rotational deviation originating in the slip engagement of the second clutch CL2 is sensed. When the determination is YES (rotational deviation is sensed), the flow advances to step S11, and when the determination is NO (rotational deviation is not sensed), the flow returns to step S9. The sensing of rotational deviation involves the sensing of the amount of rotational deviation from the relationship of input-output shaft rotational speed of the automatic transmission AT, because the ratio of this input-output shaft rotational speed is determined from the shift position gear ratio before downshifting.

In step S11, continuing either from the determination that rotational deviation is sensed in step S10, or from the determination that the next shift position has not yet been reached in step S12, speed control by the motor/generator MG is initiated, in which the sum of the target input speed of the next shift position and a predetermined speed a is set as the target speed, the motor torque of the motor/generator MG is used to increase rotation to the target speed, and the flow advances to step S12. In other words, the progress of downshifting does not depend on replacing oil pressure, and downshifting progresses due to a speed increase by the motor/generator MG.

In step S12, continuing from the rotation increase control for increasing the input speed to the next shift position+α in step S11, a determination is made as whether or not the next shift position has been reached, i.e., whether or not the input speed of the automatic transmission AT has reached the target input speed of the next shift position. When the determination is YES (the next shift position has been reached), the flow advances to step S13, and when the determination is NO (the next shift position has not been reached), the flow returns to step S11.

In step S13, continuing from the determination that the next shift position has been reached in step S12, the clutch engaging capacity of the engaged clutch in downshifting is increased, and the clutch engaging capacity of the disengaged clutch is decreased. The motor speed control, which brings (the target input speed of the next shift position+α) to the target speed, is continued, the engine Eng proceeds to be cranked by the semi-engaged first clutch CL1, and the flow advances to step S14.

Specifically, in step S13, the progress of downshifting for increasing the input speed is left to speed control by the motor/generator MG, and an on/off type of oil pressure replacement control is performed as well as the engine startup control. When the engine speed reaches a predetermined speed due to the cranking of the engine Eng, the engine Eng starts up through the initial explosion of fuel injection and ignition, and the engine goes into a state of self-sustained operation.

In step S14, continuing from the capacity control of the engaged/disengaged clutches and the continuation of the motor speed control in step S13, a determination is made as whether or not the motor speed coincides (is synchronous) with the engine speed which is the input-output speed of the first clutch CL1. When the determination is YES (is synchronous with CL1), the flow advances to step S15, and when the determination is NO (is not synchronous with CL1), the flow returns to step S13.

In step S15, continuing from the determination of synchronization with CL1 in step S14, the engaged capacity of the semi-engaged first clutch CL1 is increased to a fully engaged state. the target speeds of the engine speed and the motor speed are brought to (the target input speed of the next shift position), the speeds are made to converge so as to decrease from (the target input speed of the next shift position+α) to (the target input speed of the next shift position), and the flow advances to step S16.

In step S16, continuing from the rotation convergence of the engine speed and the motor speed in step S15, the engine speed and the motor speed reach the target input speed of the next shift position, and a determination is made as whether or not synchronization in the next shift position is complete. When the determination is NO (synchronization in the next shift position is not complete), the flow returns to step S15. When the determination is YES (synchronization in the next shift position is complete), the flow advances to ending control, the motor control is switched from speed control to torque control, the second clutch CL2 is switched from being slip-engaged to being fully engaged, and the engaged clutch oil pressure of downshifting is increased to the line pressure to make a transition to "HEV travel mode."

Next, the operation is described. First, the "problems of the comparative example" are described. Then, the operations in the control device of the FR hybrid vehicle of Embodiment 1 separately for the following: "individual control operation of engine startup," "simultaneous processing operation of engine startup control and downshifting control," "downshifting operation by speed control," and "slip engaging action of CL2 element."

When downshifting control and downshifting control are simultaneously processed, after the pre-process of downshifting, only startup control is advanced by engine braking while downshifting control remains stopped. The feature of the comparative example is that after the first clutch is determined to be synchronized, downshifting control is advanced by replacement oil pressure control of the engaged clutch and the disengaged clutch (startup first→shifting second).

Figure 7:
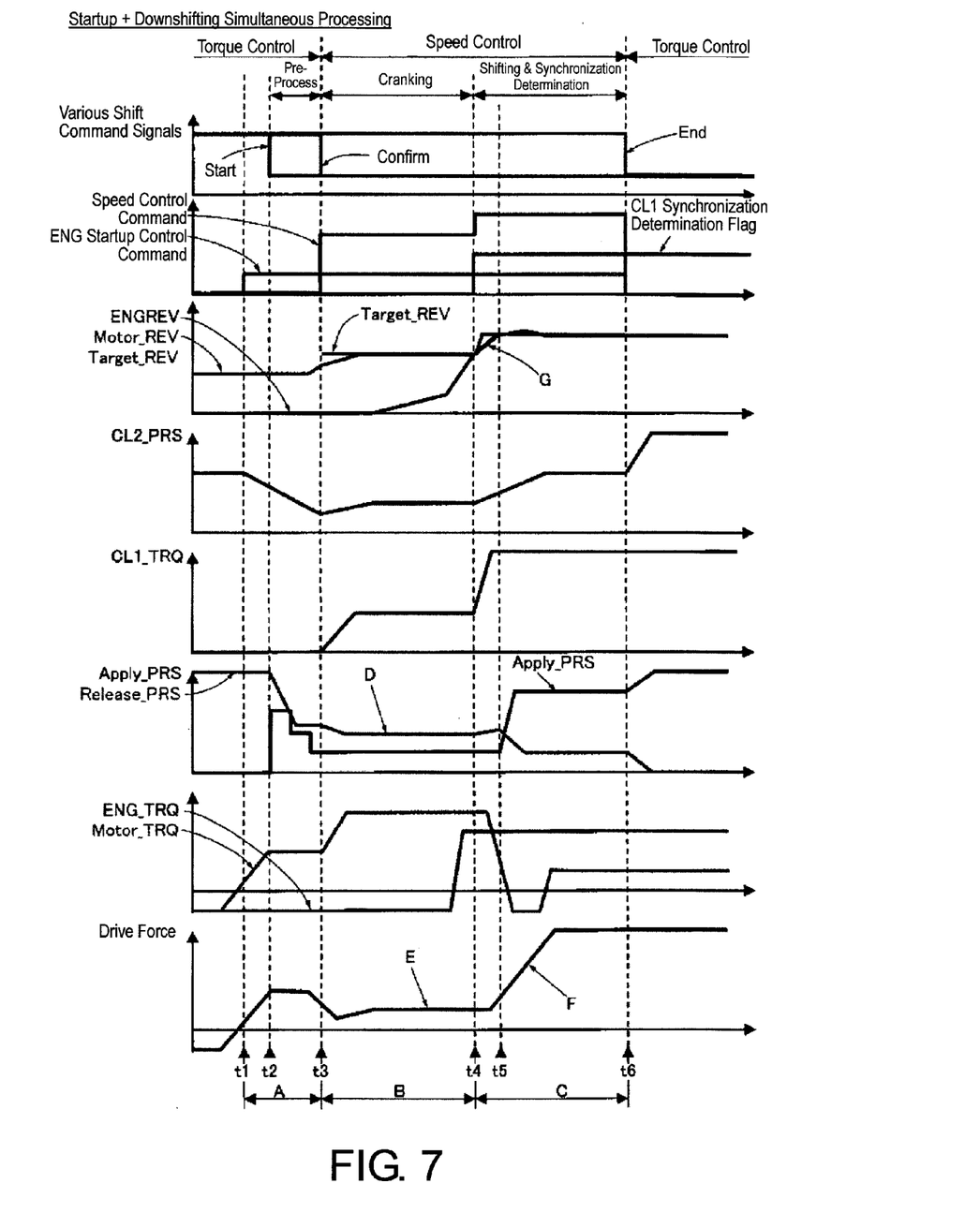
FIG. 7 is a time chart showing the characteristics of the shift command signal various, the speed control command, the engine startup control command, the CL1 synchronous determination flag, the engine speed (ENGREV), the motor speed (Motor_REV), the target motor speed (Target_REV), the second clutch pressure (CL2_PRS), the first clutch torque (CL1_TRQ), the engaging pressure (Apply_PRS), the disengaging pressure (Release_PRS), the engine torque (ENG_TRQ), the motor torque (Motor_TRQ), and the drive force, when engine startup control and downshifting control are simultaneously processed during EV travel in an FR hybrid vehicle equipped with the device of the comparative example.

The simultaneous processing operation of engine startup control and downshifting control in the comparative example is described based on the time chart shown in FIG. 7. In FIG. 7, the time t1 indicates the engine startup request timing. The time t2 indicates the downshifting request timing. The time t3 indicates the pre-process end time point from torque control, which is also the cranking start time point from speed control. The time t4 indicates the CL1 synchronizing time point. The time t5 indicates a start time point of downshifting by replacement oil pressure control. The time t6 indicates a simultaneous process end time point of engine startup control and downshifting control.

In the time chart of FIG. 7, when there is an engine startup request at time t1, slip control of the second clutch CL2 is initiated by a decrease in clutch pressure, as shown by the characteristics of the second clutch (CL2_PRS). Thereafter, when there is a downshifting request at time t2, the pre-process (standby phase) for the engaged clutch element and the disengaged clutch element of downshifting is initiated, as shown by the characteristics of the engaging pressure (Apply_PRS) and the disengaging pressure (Release_PRS). Thereafter, when the pre-process ends at time t3, the motor/generator MG switches from torque control to speed control, and control is ended in the area A from time 11 until time t2 during which the torque capacity of the second clutch CL2 is reduced.

In area B, from time t3 when the pre-process ends until time t4 when CL1 synchronization is determined, the torque capacity of the engaged clutch element is maintained at standby capacity as shown by the characteristics of the engaging pressure (Apply_PRS), and the torque capacity of the disengaged clutch element is maintained at or above the torque capacity of the second clutch CL2, whereby shift control of downshifting does not progress. The torque capacity of the second clutch CL2 is kept less than the disengaged clutch torque capacity and equal to or less than the target drive torque as shown by the characteristics of the second clutch pressure (CL2_PRS), whereby drive force is managed at the torque capacity of the second clutch CL2. In other words, in area B, downshifting control does not progress, and only engine startup control by engine braking progresses, as shown by the characteristics of the engine speed (ENGREV) and the first clutch torque (CL1_TRQ). Control is then performed for causing the initial explosion in the engine by fuel supply and ignition.

In area C, from time 4 when CL1 synchronization is determined until time t6 when CL2 synchronization is determined, the torque phase is maintained until time t5, and when time t5 is reached, the engaging pressure is increased with a sudden slope and the torque capacity of the engaged clutch element is brought to or above the torque capacity of the second clutch CL2 as shown by the characteristics of the engaging pressure (Apply_PRS), while the torque capacity of the disengaged clutch element is brought to or below the standby capacity and downshifting is advanced by the inertia phase as shown by the characteristics of the disengaging pressure (Release_PRS). The torque capacity of the second clutch CL2 is made to equal to the target drive torque as shown by the characteristics of the second clutch pressure (CL2_PRS), whereby the drive force is managed at the torque capacity of the second clutch CL2. In other words, in area C, control is performed so that downshifting is advanced and the engine after startup is controlled so the torque is equivalent to the accelerator position, thereby ensuring a vehicle drive force that increases corresponding to the acceleration request as shown by the drive characteristics.

At time t6 when CL2 synchronization is determined, the motor/generator MG is returned from speed control to torque control, the engaged clutch element is fully engaged and the disengaged clutch element is fully disengaged as shown by the characteristics of the engaging pressure (Apply_PRS) and the disengaging pressure (Release_PRS), and re-engaging control of the second clutch CL2 is performed as shown by the characteristics of the second clutch pressure (CL2_PRS).

Thus, in the comparative example, as a simultaneous processing concept of engine startup+downshifting, the second clutch CL2 as the slip-controlled element is the clutch that has the most torque-cutoff effect and that is independent from downshifting, and downshifting is fully completed during torque capacity control of the second clutch CL2. The "area B reasoning" from time t3 to time t4 and the "area C reasoning" from time t4 to time t5 are as follows.

Area B Reasoning—Of the three clutches engaged in an in-gear state (C2, C3, B3 during the fourth speed), torque capacity control is performed on two elements: the second clutch CL2 (the second clutch C2) as the slip-controlled element, and the disengaged clutch element (the third clutch C3) as the shift disengaged element. The basic reasoning is as follows.

CL2 torque capacity<disengaged clutch torque capacity
whereby the second clutch CL2 is made to slip and the drive force is controlled.

Shifting control is not performed during the synchronization determination phase in area B for the following reasons.

There is no alternating between the engaged element and the disengaged element during cranking of the engine Eng.

It is thereby possible to prevent changes in the allotment ratio and blocking effects of the second clutch CL2 caused by changes in the internal state of the automatic transmission AT.

The disengaged element of shifting is not moved during cranking of the engine Eng.

It is thereby possible to continue the slip-engaged state of the second clutch CL2 during cranking of the engine Eng.

Area C Reasoning—The engaged element and the disengaged element are alternated during downshifting, while simultaneously torque capacity control of the second clutch CL2 is performed.

CL2 torque capacity<engaged clutch torque capacity
Disengaged element pressure is reduced to standby pressure or less
whereby downshifting can be advanced reliably.

Furthermore, in order to confirm that the engaged clutch element after downshifting has locked up (is in a fully engaged state):

second clutch CL2 is determined to be synchronized by differential rotation convergence calculated from rotation sensor information shifting control is determined to by synchronized by gear ratio Both of these conditions being established ends the control.

Thus, in the case of a simultaneous process in the comparative example, the progress of downshifting control is stopped and only engine startup control is advanced in area B, the height of the characteristics D of the disengaging pressure (Release_PRS) differs due to the difference in engine startup request timing, and the torque capacity of the disengaged clutch element cannot be maintained at or above the torque capacity of the second clutch CL2. Therefore, when an engine startup request is issued at a timing during downshifting, for example, no disengaging pressure (Release_PRS) remains, the automatic transmission is in a nearly neutral state, and it is difficult to manage drive force (the drive force characteristics E) during cranking, such that drive force cannot be output during cranking.

In the case of a simultaneous process in the comparative example, the progress of downshifting control is stopped in area B and downshifting control is advanced after entering area C, and the drive force intended by the driver is therefore achieved at time t5 in area C and onward as shown by the drive force characteristics F in FIG. 7. Specifically, the overlapping of the timings of the downshifting request and the engine startup request during travel is a situation of a high acceleration request, such as the driver pressing the acceleration pedal. In the comparative example, engine startup control is performed first and then downshifting control is performed, and time is therefore required to reach the drive force intended by the driver after the engine startup request timing. In other words, it is not possible to comply with a high acceleration request from the driver.

Furthermore, in the case of a simultaneous process in the comparative example, at time t4 when L1 synchronization is determined, the target speed (Target_REV), which had been set to a value slightly less than the target input speed of the next shift position, is increased to the target input speed of the next shift position (G in FIG. 7). Therefore, the difference in the target speed (Target_REV) before and after shifting is small, and when this difference before and after shifting is small, it is not possible to control the racing of an engine that has little speed control precision. This makes downshifting control by oil pressure replacement difficult, which is initiated from time t5 immediately after time t4.

When an engine startup request and a downshifting request are issued at overlapping timings, a simultaneous processing is necessary. However, only the engine startup control is processed in compliance with the engine startup request when a downshifting request is issued at a separate timing from the engine startup request. An engine startup individual control operation that reflects this is described below.

When "EV travel mode" has been selected and there is an engine startup request along with a selection of "HEV travel mode" as the target travel mode, one option is that that downshifting is not taking place and there is no downshifting request. In this case, the progress of the flowchart in FIG. 6 is step S1→step S2→step S3→step S5→step S6, and engine startup control is initiated in step S2. When a state of no downshifting and no downshifting request thereafter continues, the flow of step S3→step S5→step S6 is repeated, whereby engine startup individual control is performed.

When "EV travel mode" has been selected and there is an engine startup request along with a selection of "HEV travel mode" as the target travel mode, one option is that downshifting is taking place and shifting will progress beyond the finish phase. In this case, the progress of the flowchart in FIG. 6 is step S1→step S2→step S3→step S4→step S6, and engine startup control is initiated in step S2. Normal downshifting control of advancing downshifting in the same manner is thereafter performed, as well as engine startup individual control by repeating the flow of step S3→step S4→step S6.

In this engine startup individual control, the first clutch CL1 disengaged in "EV travel mode" is semi-engaged, the engine Eng is cranked using the motor/generator MG as a starter motor, the engine Eng is started up by fuel supply or ignition, and the first clutch CL1 is then engaged.

The problems with simultaneous processing in the above comparative example are that it is difficult to manage drive force during cranking and time is required to reach the drive force intended by the driver, and these problems must be resolved. The following is a description of the simultaneous processing operation of engine startup control and downshifting control which reflects this.

During coasting travel due to "EV travel mode" being selected in the fourth speed, for example, when the driver presses the acceleration pedal intending to accelerate, the driving point (APO, VSP) on the shift map shown in FIG. 2 moves from point H to point H'. At this time, the engine startup request is issued first due to the driving point crossing the EV→HEV switching line at point h while moving, after which the 4→3 downshifting request is issued due to the driving point crossing the 4→3 downshifting line at point h'.

Thus, when two requests are issued at timings such that the engine startup request is first and the downshifting request is second, the progress of the flowchart in FIG. 6 is step S1→step S2→step S3→step S5→step S6. Until there is a downshifting request in step S5, the flow of step S3→step S5→step S6 is repeated. When there is afterward a downshifting request, the flow advances from step S5 to step S7, the pre-process of the engaged element and the disengaged element of downshifting is executed in step S7, and after the pre-process has ended, the flow advances to step S9 and beyond and simultaneous processing is performed.

During coasting travel due to "EV travel mode" being selected in the fourth speed, for example, when the driver presses the acceleration pedal intending to accelerate, the driving point (APO, VSP) on the shift map shown in FIG. 2 moves from point I to point I'. At this time, a 4→3 downshifting request is issued first due to the driving point crossing the 4→3 downshifting line at point i' while moving, and an engine startup request is then issued due to the driving point crossing the EV→HEV switching line at point i.

Thus, when two requests are issued with timings such that the downshifting request is first and the engine startup request is second, the progress of the flowchart in FIG. 6 is step S1→step S2→step S3→step S4. In step S4, when it is determined that the pre-process or the torque phase is taking place, the flow advances to step S8. In step S8, when it is determined that the pre-process has not ended, the flow advances to step S7, the pre-process is executed on the engaged element and the disengaged element of downshifting, and after the pre-process has ended, the flow advances to step 9 and beyond and simultaneous processing is performed. In step S8, when it is determined that the pre-process has ended, the flow advances to step S9 and beyond and simultaneous processing is performed.

When a 4→3 downshifting request is issued as described above, for example, the second brake B2 (LOW/B) is designated as the engaged clutch element of the 4→3 downshift, and the third clutch C3 (H&LR/C) is designated as the disengaged clutch element of the 4→3 downshift. The second clutch C2 (D/C) is designated as the second clutch CL2 which is slip-controlled during engine startup control.

Simultaneous processing of engine startup control and downshifting control (step S9 to step S16) is described. In step S9, after the pre-process has ended, the engaging action of semi-engaging the first clutch CL1 is initiated and the disengaging action of slip-engaging the second clutch CL2 is initiated, until rotational deviation is sensed in step S10.

When rotational deviation is sensed in step S10, speed control by the motor/generator MG is initiated in step S11, wherein the sum of the target input speed of the next shift position and a predetermined speed a is set as the target speed. When it is determined in step S12 that the next shift position has been reached, the motor torque of the motor/generator MG is used to execute speed control for increasing rotation to the target speed.

When the next shift position is determined to have been reached in step S12, in step S13, the clutch engaging capacity of the engaged clutch in downshifting is raised to a level of maintaining the torque capacity of the next shift position, and the clutch engaging capacity of the disengaged clutch is lowered (drained). Motor speed control for setting (the target input speed of the next shift position+α) to the target speed is continued until the first clutch CL1 is determined to have synchronized in step S14, and cranking of the engine Eng by the semi-engaged first clutch CL1 proceeds.

When it is determined in step S14 that the first clutch CL1 has synchronized, in step S15, the engaging capacity of the semi-engaged first clutch CL1 is increased to a fully-engaged state. Until the determination in step S16 that synchronization in the next shift position is complete, control is performed whereby the target speeds of the engine speed and the motor speed are set to (the target input speed of the next shift position), and rotation convergence causes the speed to decrease from (the target input speed of the next shift position+α) to (the target input speed of the next shift position).

When it is determined in step S16 that synchronization in the next shift position is complete, simultaneous processing control is ended, the motor control is switched from speed control to torque control, and the second clutch CL2 is switched from slip-engaged to fully engaged. The engaged clutch oil pressure of downshifting is increased to the line pressure to transition to "HEV travel mode."

Figure 8:
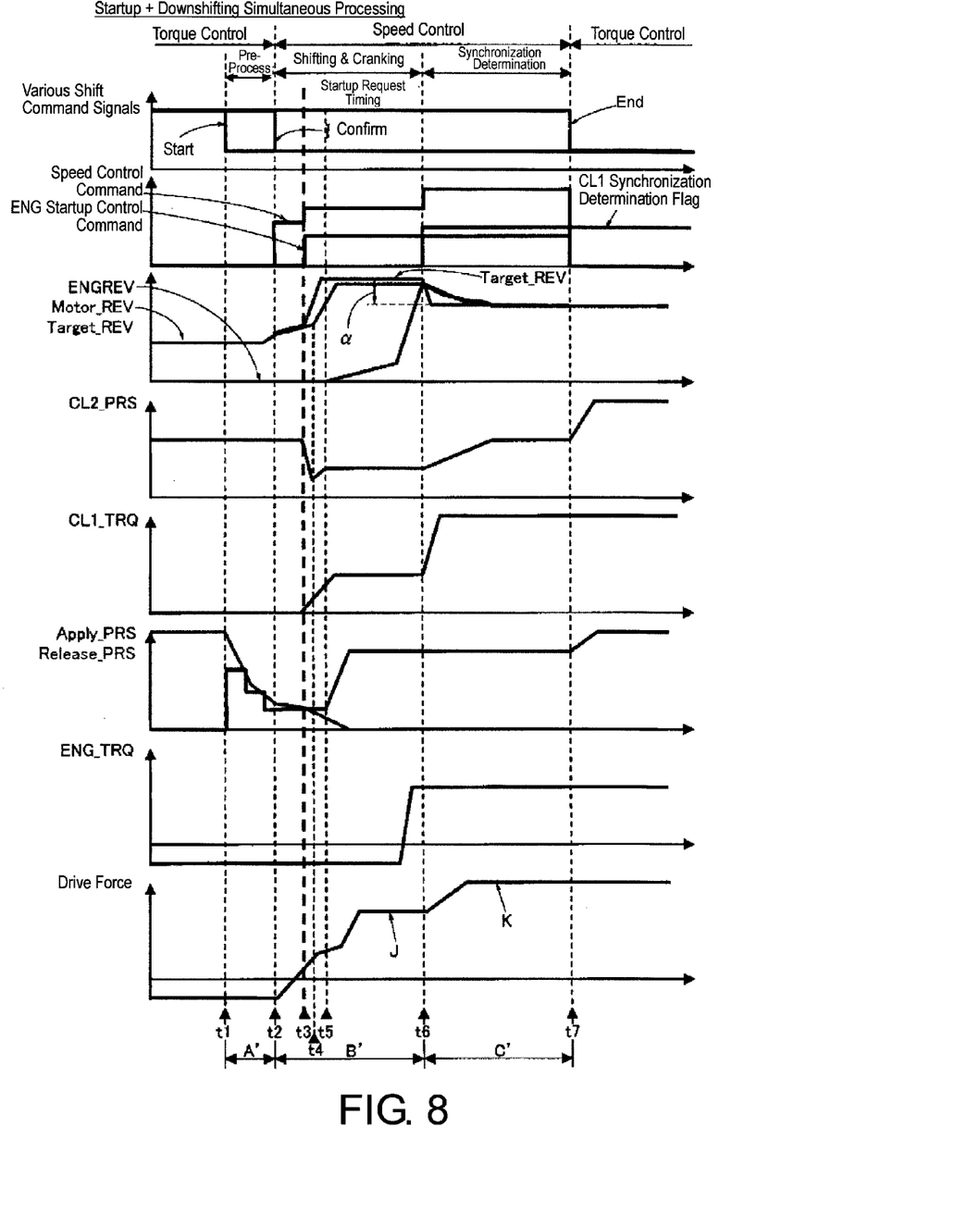
FIG. 8 is a time chart showing the characteristics of the shift command signal various, the speed control command, the engine startup control command, the CL1 synchronous determination flag, the engine speed (ENGREV), the motor speed (Motor_REV), the target motor speed (Target_REV), the second clutch pressure (CL2_PRS), the first clutch torque (CL1_TRQ), the engaging pressure (Apply_PRS), the disengaging pressure (Release_PRS), the engine torque (ENG_TRQ), the motor torque (Motor_TRQ), and the drive force, when engine startup control and downshifting control are simultaneously processed during EV travel in an FR hybrid vehicle equipped with the device of Embodiment 1.

This simultaneous processing operation of engine startup control and downshifting control in Embodiment 1 is described based on the time chart shown in FIG. 8. FIG. 8 shows a case in which the driver presses the acceleration pedal intending to accelerate during coasting travel due to "EV travel mode" being selected in the fourth speed, whereby a 4→3 downshifting request is issued first, and an engine startup request is then issued. In FIG. 8, time t1 indicates the downshifting request timing at which the pre-process is initiated. Time t2 indicates the pre-process ending time point, which is also the time point at which torque control switches to speed control. Time t3 indicates an engine startup request timing. Time t4 indicates the time point at which input speed control is initiated by motor speed control. Time t5 indicates the time point at which the next shift position is reached. Time t6 indicates the CL1 synchronization time point. Time t7 indicates the ending time point of the simultaneous processing of engine startup control and downshifting control.

The following is a description of the control operation of area A' from time t1 to time t2 when the pre-process is executed in the time chart of FIG. 8. When there is a downshifting request at time t1, the pre-process (standby phase) for the engaged clutch element and the disengaged clutch element of the downshifting is initiated, as shown by the characteristics of the engaging pressure (Apply_PRS) and the disengaging pressure (Release_PRS). Then, when the pre-process ends at time t2, the motor/generator MG is switched from torque control to speed control, and the control of area A', in which the pre-process is performed in advance of the simultaneous processing, is ended.

Next is a description of the control operation of area B', from the pre-process ending time t2 until the time t6 at which downshifting and cranking end. From time t2 of switching to speed control until time t3 at which there is an engine startup request, speed control is performed for gradually increasing the motor speed (=transmission input speed) along the target motor speed (Target_REV), as shown by the characteristics of the motor speed (Motor_REV). The motor torque thereby increases, whereby the negative drive force changes to positive drive force as shown by the drive force characteristics. When there is an engine startup request at time t3, slip control of the second clutch CL2 is initiated by a decrease in clutch pressure, as shown by the characteristics of the second clutch pressure (CL2_PRS). At the same time, the first clutch CL1 is given a torque capacity by causing the piston of the first clutch CL1 to travel a stroke towards semi-engagement, as shown by the characteristics of the first clutch torque (CL1_TRQ). When it is then confirmed that the second clutch CL2 is slip-engaged at time t4, speed control is performed for increasing the motor speed all at once to the target motor speed (Target_REV), which is set to the target input speed of the next shift position+α, as shown by the characteristics of the motor speed (Motor_REV). When the motor speed (Motor_REV) then reaches the next shift position input speed at time t5, the torque capacity of the engaged clutch element is increased as shown by the characteristics of the engaging pressure (Apply_PRS), and the disengaged clutch element is drained and disengaged as shown by the characteristics of disengaging pressure (Release_PRS). Thereby, at the time point when the torque capacity of the engaged clutch element is ensured immediately after time t5, downshifting advances until the ending area. The torque capacity of the second clutch CL2 is then made to equal the target drive torque as shown by the characteristics of the second clutch pressure (CL2_PRS), whereby the drive force is managed by the torque capacity of the second clutch CL2. From time t5 to time t6, in a progression that overlaps the ending area of downshifting, engine startup control is made to progress by engine cranking as shown by the characteristics of the engine speed (ENG_REV) and the first clutch torque (CL1_TRQ). The engine startup control is thereby ended in time t6 which is after the downshifting.

The following is a description of the control operation of area C', from time t6 when the CL1 synchronization is determined until time t7 when synchronization in the next shift position is complete. When the CL1 synchronization is determined at time t6, the engine Eng and the motor/generator MG are directly linked via the engaged first clutch CL1 by causing the piston of the first clutch CL1 to travel a stroke towards fully engaging, as shown by the characteristics of the first clutch torque (CL1_TRQ). At time t6 when the CL1 synchronization is determined, the engine speed and the motor speed are at the target motor speed (Target_REV) which is set to the target input speed of the next shift position+α, and the engine speed is therefore gradually reduced by motor speed control to the input speed of the next shift position. The engine speed and the motor speed then converge on the input speed of the next shift position at time t7, thereby ending area C'.

Thus, in Embodiment 1, as a simultaneous processing concept of engine startup+downshifting, the second clutch CL2 as the slip-controlled element is the clutch that has the most torque-cutoff effect and that is independent from downshifting. The "area B' reasoning" from time t2 to time t6 is that downshifting (input rotation increase) is ended during cranking and the first clutch CL1 is synchronized after the increase in rotation. In other words, unlike the comparative example, simultaneous processing of shifting first→startup second is performed.

The engine startup request intervenes at various timings, such as before downshifting is initiated (FIG. 7) and after downshifting is initiated (FIG. 8), for example. Simultaneous processing is performed for ending downshifting control prior to engine startup control, whereby the internal state of the automatic transmission AT is changed to a drive force transmission state of the next shift position at the ending time point of downshifting control (a time point slightly after time t5 at which the engaged element has a torque capacity). Therefore, when drive force management is performed during cranking, the drive force management does not rely on the disengaging pressure of downshifting control which is at a different height due to the difference in engine startup request timing, as it does in the comparative example. Specifically, drive force management during cranking can be performed easily by managing the capacity of the second clutch CL2, as shown by the drive force characteristics J in FIG. 8, when the internal state of the automatic transmission AT changes to the drive force transmission state of the next shift position.

By performing simultaneous processing for ending downshifting control ahead of engine startup control, the interior of the automatic transmission AT reaches a shift position state after downshifting of being able to transmit high drive force earlier than in cases in which downshifting control is advanced after engine startup control has ended, as is the case in the comparative example.

Therefore, there is a shorter amount of time from the starting time point t3 of the engine startup request to the time point at which the drive force intended by the driver is reached (a time point shortly after the time t6), as shown by the drive force characteristics K in FIG. 8.

As described above, when simultaneous processing is performed for performing downshifting control ahead of engine startup control, the shock or lag of startup and downshifting must be stabilized regardless of the startup request timing. The following is a description of a downshifting operation by speed control that reflects this.

Downshifting control for increasing the transmission input shaft speed during downshifting which requires a short amount of time, assuming that the transmission output shaft speed (=vehicle speed), which has large inertia, is constant. When this speed increase control is performed by replacement control of the engaged element and the disengaged element of the downshifting, the disengaged element is operated smoothly by lowering the torque capacity of the disengaged element, and the transmission input shaft speed is slowly increased. The speed increase control is then performed by precise load control wherein the moment the transmission input shaft speed reaches the target speed of the next shift position, the engaged element is put into a torque-transmitting state, the transmitted torque is allotted, and the torque capacity of the disengaged element is quickly cut off. However, although it is preferable to quickly cut off the torque capacity of the disengaged element the moment the transmission input shaft speed reaches the target speed, when even a small torque capacity remains in the disengaged element, negative torque is transmitted to the drive system, which readily causes draw shock.

Embodiment 1 employs a configuration in which the increase in input speed from downshifting is achieved by speed control for using the motor torque of the motor/generator MG to increase the speed to the target input speed.

With this configuration, downshifting progresses responsively due to the speed increase of the motor/generator MG. Downshifting control by oil pressure replacement should be simple so that the engaged element of downshifting can be known after the input speed has increased. Therefore, not only can the time required from the start of downshifting to the end of downshifting be shortened, but downshifting control that prevents draw shock can be easily performed.

In Embodiment 1, the target motor speed (Target_REV) in motor speed control is the predetermined value a added to the target input speed of the next shift position. Therefore, while engine startup control (cranking) is performed, the predetermined value α is designated as the slip amount in the next shift position, and the second clutch CL2 is guaranteed to be slip-engaged.

Engine startup control is control for causing large fluctuations in the torque transmitted to the drive system, and the engine startup shock that occurs with large torque fluctuations must be minimized. The following is a description of the slip-engaging operation of the CL2 element which reflects this.

In a one-motor two-clutch parallel hybrid system having, such as the FR hybrid vehicle of Embodiment 1, torque fluctuations during engine startup are blocked by causing the clutch (CL2) disposed between the motor and the drive wheels to slip during engine startup while the vehicle is traveling.

In this case, when the automatic transmission AT having a planetary gear mechanism is incorporated, according to selection means which are meant to simultaneously process engine startup and downshifting, the shifting disengaged element which is disengaged during shifting is defined as the second clutch CL2. In other words, the clutch that is the disengaged element during shifting transitions from an engaged state to a disengaged state to advance shifting; therefore, in the stage taking place while shifting is advancing, the disengaged element becomes slip-engaged. Consequently, when the shifting disengaged element is defined as the second clutch CL2, the function of the second clutch CL2 can be added to the shifting functions merely by changing over to control for maintaining the slip-engaged state.

However, when the shifting disengaged element is defined as the second clutch CL2, the input torque relative to the output torque differs, as does the contribution of the clutch torque, depending on the shifting disengaged element in each of the shift positions, and there are shift positions at which engine startup shock cannot be blocked. In other words, the shock is transmitted if the conditions are insufficient for selecting the second clutch CL2 during simultaneous processing with shifting and the selected shifting disengaged element has a low startup shock-blocking effect. Furthermore, because the torque capacity control for the shifting disengaged element changes between a simple startup of only engine startup control and simultaneous processing of engine startup and shifting, both shock blocking and shifting cannot be expected during simultaneous processing of engine startup and shifting.

In simultaneous processing of engine startup control and shifting control of Embodiment 1, the friction element defined in step S2 as the second clutch CL2, which is slip-engaged during engine startup control, is the friction element that is not engaged or disengaged even when engine startup control and downshifting control are simultaneously processed, and that remains engaged at least after downshifting. Specifically:

The second clutch CL2 is actuated together with the engaged clutch element and the disengaged clutch element during shifting.

Engine startup and shifting are ended while the second clutch CL2 is slipping.

The target drive force shape is imparted as the second clutch oil pressure because the vehicle drive force is actualized in the second clutch CL2.

Therefore, the following merits can be achieved:

Engine startup shock can be blocked because the second clutch CL2 slips.

The same fluctuating torque blocking effect as that of independent startup can be expected because the same second clutch CL2 is used as in independent startup in which only engine startup control is performed.

There is a good response to the driver's intent of a drive force request, because engine startup and shifting control are advanced simultaneously.

Next, the effects are described. In a control device of the FR hybrid vehicle of Embodiment 1, the effects listed below can be achieved.

(1) The control device comprises: an engine Eng; a motor (motor/generator MG) provided to a drive system from the engine Eng to drive wheels (left and right rear wheels RL, RR) and having a drive motor function as well as an engine startup motor function; a first clutch CL1 for switching to a hybrid vehicle travel mode (HEV travel mode) by engaging and an electric automobile travel mode (EV travel mode) by disengaging, the first clutch being installed between the engine Eng and the motor (motor/generator MG); an automatic transmission AT for automatically varying a gear ratio, the automatic transmission being installed between the motor (motor/generator MG) and the drive wheels (left and right rear wheels RL, RR); a second clutch CL2 for maintaining a slip-engaged state during engine startup control, the second clutch being installed in any position from the motor (motor/generator MG) to the drive wheels (left and right rear wheels RL, RR); and a startup/shifting simultaneous processing section (FIG. 6) for ending downshifting while the engine Eng is being cranked by the torque capacity control of the first clutch CL1, and performing a synchronous determination of the first clutch CL1 after the input speed has increased due to the downshifting ending, when there is a simultaneous processing during travel of startup control of the engine Eng initiated based on a startup request, and downshifting control of the automatic transmission AT initiated based on a shift request. Therefore, when engine startup control and downshifting control are simultaneously processed during travel, it is possible to simplify drive force management during cranking regardless of the timing of the engine startup request, and the drive force intended by the driver can be achieved sooner.

(2) The startup/shifting simultaneous processing means (FIG. 6) brings about the increase in input speed of the downshifting by speed control, in which the motor torque of the motor/generator MG is used to increase the speed to the target input speed (step S11). Therefore, when engine startup and downshifting are simultaneously processed, not only can the time required from the start of downshifting to the end of downshifting be shortened, but downshifting control that prevents draw shock can be easily performed.

(3) The second clutch CL2 selects one friction element disposed in a drive force transmission path from a plurality of friction elements (C1, C2, C3, B1, B2, B3, B4) for reaching a plurality of shift positions of the automatic transmission; and the startup/shifting simultaneous processing means (FIG. 6) defines the selection of the second clutch as the friction element that is engaged at least after downshifting (step S2).

Therefore, when engine startup and downshifting are simultaneously processed, engine startup can be effectively minimized by maintaining the slip-engaged state of the second clutch CL2, which blocks fluctuating torque during the cranking continuing from downshifting.

The control device for a hybrid vehicle of the present invention is described above based on Embodiment 1, but the specific configuration is not limited to this Embodiment 1, and variations, additions, and other modifications to the design are allowed so long as they do not deviate from the scope of the invention according to the patent claims.

In Embodiment 1, an example was presented in which advancing of downshifting is achieved through speed control by the motor/generator MG when engine startup and downshifting are simultaneously processed. However, the downshifting may be advanced through replacement oil pressure control, or the downshifting may be advanced through a combination of replacement oil pressure control and motor speed control. In other words, simultaneous processing is preferred in which downshifting control is ended before engine startup control ends (during cranking).

In Embodiment 1, an example was presented in which the engine startup request is issued after the downshifting request. However, the startup/shifting simultaneous process can still be applied when the downshifting request is issued after the engine startup request, or when the engine startup request and downshifting request are issued with coinciding timings.

In Embodiment 1, an example was presented in which the friction element (the second clutch CL2) slip-controlled in the engine startup control area is selected from a plurality of friction elements housed within a multi-speed automatic transmission AT. However, the present invention is established even in cases in which a friction element provided separate from the torque is selected as the second clutch CL2. Therefore, a friction element which is provided separate from the automatic transmission AT between the motor/generator MG and the transmission input shaft, and which remains engaged during travel, may be selected as the second clutch CL2. The second clutch CL2 may also be a friction element which is provided separate from the automatic transmission AT between the transmission input shaft and the drive wheels, and which remains engaged during travel.

In Embodiment 1, an example was presented in which a multi-speed automatic transmission having seven forward speeds and one reverse speed is used as the automatic transmission. However, the number of shift positions is not limited as such, and the automatic transmission preferably has a plurality of shift positions as the shift positions. Furthermore, a belt-type continuously variable transmission, whereby the gear ratio is automatically varied without speed levels, may be used as the automatic transmission.

In Embodiment 1, an example was presented in which the present invention was applied to an FR hybrid vehicle comprising a one-motor two-clutch drive system. However, the present invention can also be applied to an FF hybrid vehicle comprising a one-motor two-clutch drive system.

The invention claimed is:

1. A hybrid vehicle control device comprising:
   an engine;
   a motor provided to a drive system from the engine to a drive wheel and having a drive motor function as well as an engine startup motor function;
   a first clutch for switching to a hybrid vehicle travel mode by engaging and an electric vehicle travel mode by disengaging, the first clutch being installed between the engine and the motor;
   an automatic transmission for automatically varying a gear ratio, the automatic transmission being installed between the motor and the drive wheel;
   a second clutch for maintaining a slip-engaged state during an engine startup control that includes during cranking, the second clutch being installed in any position from the motor to the drive wheel; and
   a controller including a startup/shifting simultaneous processing section programmed such that during a simultaneous processing of the engine startup control initiated based on a startup request and a downshifting control of the automatic transmission initiated based on a shift request while traveling, a friction element that remains engaged before and after downshifting is used as the second clutch, the downshifting is completed by disengaging a friction element that is disengaged for the downshifting and engaging an engaged element that is engaged for the downshifting during cranking of the engine by increasing speed of the motor and torque capacity control of the first clutch, and the automatic transmission is placed into a state of transmitting drive force in a shift position occurring after the downshifting.

2. The hybrid vehicle control device according to claim 1, wherein
   the startup/shifting simultaneous processing section is further programmed to cause the first clutch to travel a stroke in an engaging direction and initiate the engine startup control before the downshifting is complete, when there is, during travel, the simultaneous processing of the engine startup control and the downshifting control of the automatic transmission.

3. The hybrid vehicle control device according to claim 2, wherein
   the startup/shifting simultaneous processing the startup/shifting simultaneous processing section is further programmed to use torque of the motor to increase an input speed of the automatic transmission to a target input speed during the downshifting control, and to initiate control for engaging the engaged element which is engaged for the downshifting when the target input speed is reached.

4. The hybrid vehicle control device according to claim 3, wherein
   the second clutch selects one friction element disposed in a drive force transmission path from a plurality of friction elements for reaching a plurality of shift positions of the automatic transmission; and
   the startup/shifting simultaneous processing section is programmed to define a selection of the second clutch as at least the friction element that is engaged at least after the downshifting.

5. The hybrid vehicle control device according to claim 4, wherein
   the startup/shifting simultaneous processing section is programmed to set a target speed of the motor to a value that is equal to a sum of a predetermined value and the target input speed of a next shift position of the downshifting.

* * * * *